Aug. 2, 1960   J. F. GREENE ET AL   2,947,117
APPARATUS AND METHOD FOR TREATING INTERIOR
SURFACES OF GLASS CONTAINERS
Filed Oct. 13, 1955   2 Sheets-Sheet 1
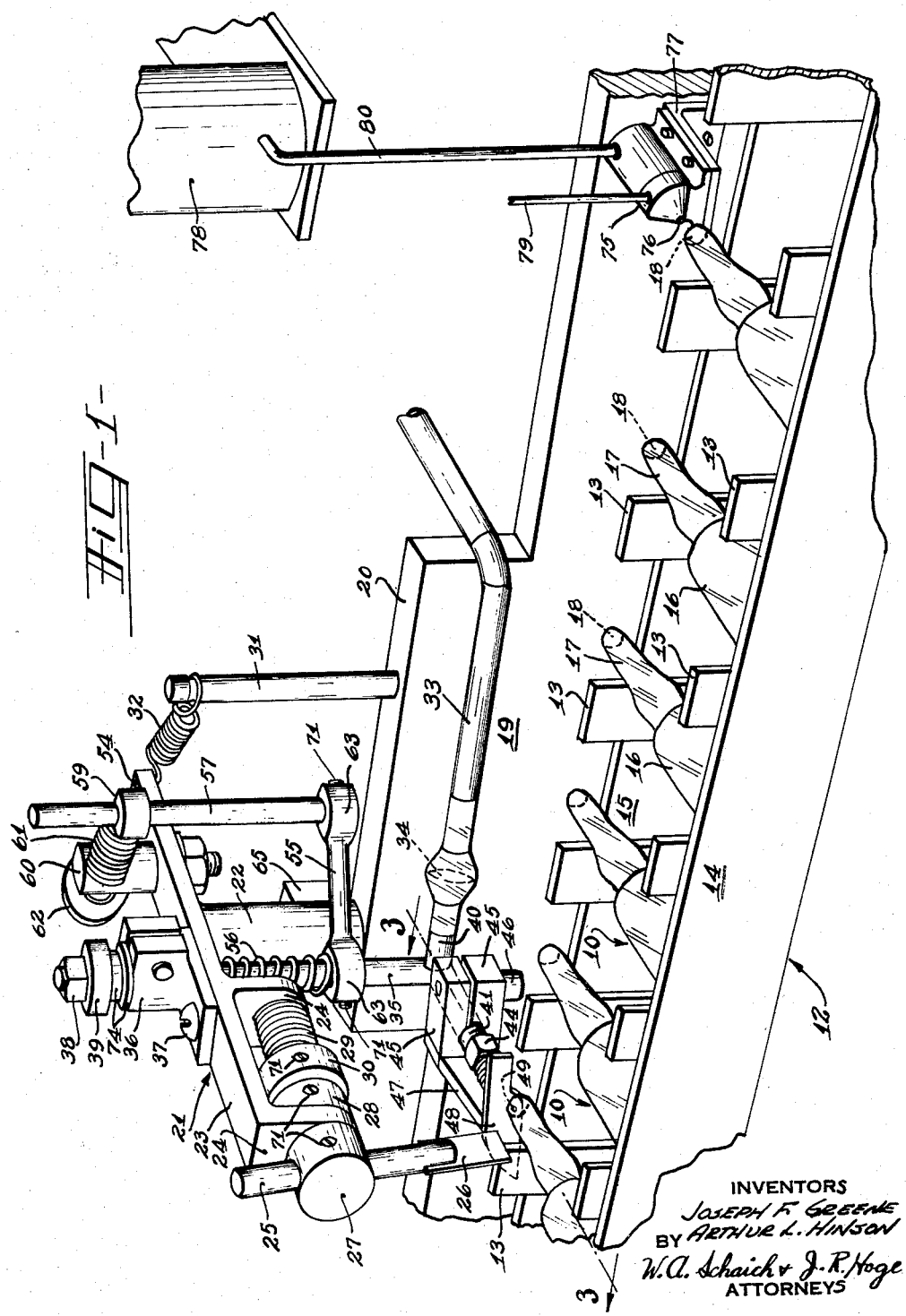
FIG-1-
INVENTORS
JOSEPH F. GREENE
ARTHUR L. HINSON
BY
W.A. Schaich & J.R. Hoge
ATTORNEYS

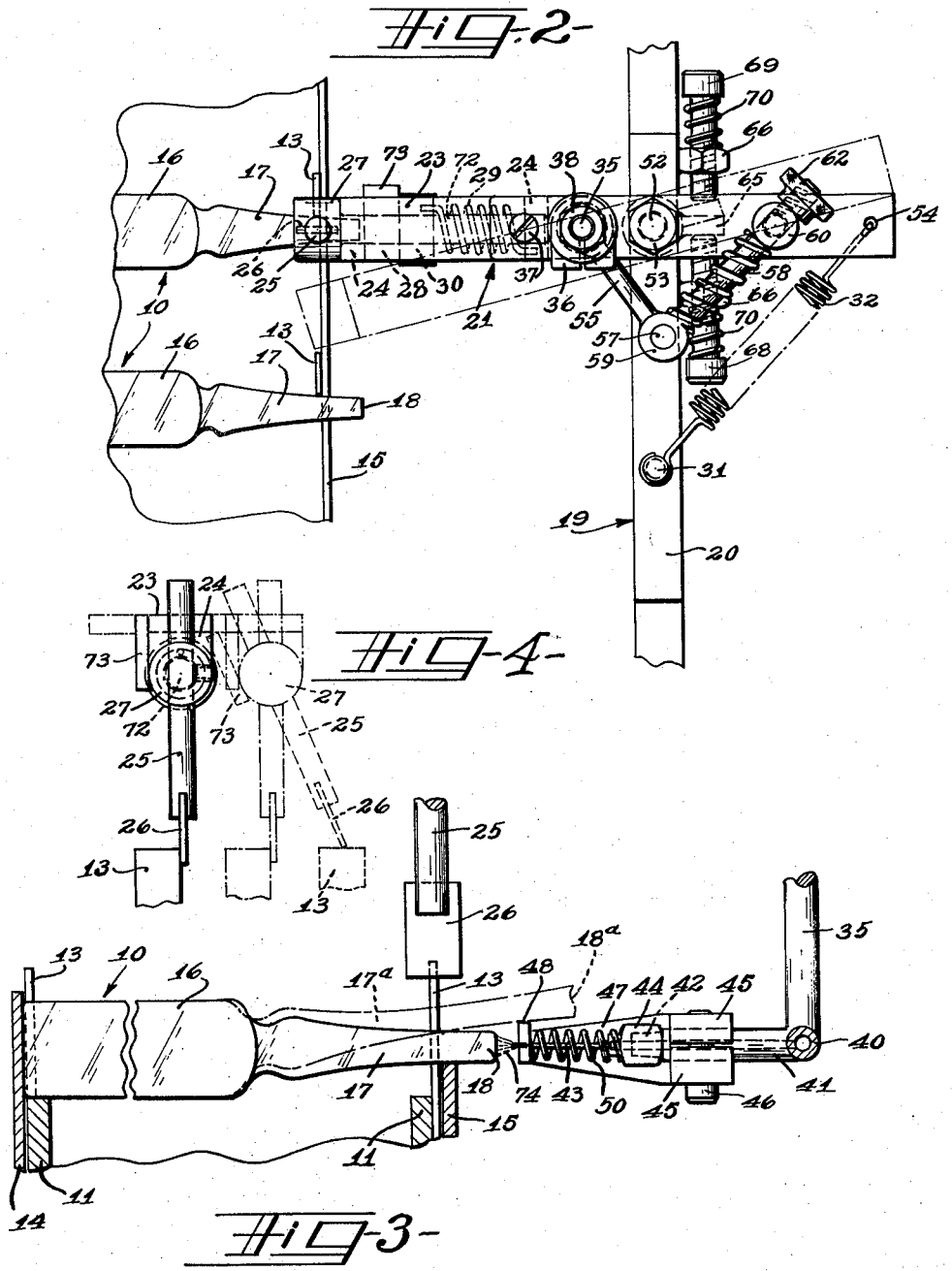

United States Patent Office 2,947,117
Patented Aug. 2, 1960

2,947,117

APPARATUS AND METHOD FOR TREATING INTERIOR SURFACES OF GLASS CONTAINERS

Joseph F. Greene, Vineland, and Arthur L. Hinson, Mauricetown, N.J., assignors to Owens-Illinois Glass Company, a corporation of Ohio Filed Oct. 13, 1955, Ser. No. 540,250

8 Claims. (Cl. 49—89)

The present invention pertains to improvements in apparatus and methods for treating the surfaces of glass or ceramic containers and more specifically to treating the interior surfaces of glass bottles, jars, or ampuls. This invention provides both novel apparatus and methods for producing more durable and unreactive internal surfaces within hollow glass articles to improve their resistance to weathering and to reduce their chemical reactivity.

In the manufacture of glass articles such as vaccine bottles, or ampuls, various amounts of alkali which constitute a substantial part of the glass composition, are brought to the surface of the article during its formation. This is particularly true in the case of small glass ampuls which are fabricated from lengths of glass tubing. A length of tubing is heated in a forming machine and shaped into an ampul of prescribed dimensions by sealing the tubing at one end and forming a long narrow stem at the other. In these areas which are reworked by heating the glass, greater amounts of alkali are brought to the surface of the glass either exposed or in close proximity to the exposed surface. In the heated areas this alkali forms a very thin layer of glass which has a higher alkali content than the normal glass. This thin layer is not as stable as the normal glass which is indicated by its greater leachability and chemical reactivity with certain reagents.

Aqueous solutions which are contained within glass bottles or ampuls for medicinal use have shown a marked tendency to leach out the alkali at or near the interior surfaces. This leaching may also occur when the open containers are stored in a humid atmosphere prior to filling. The leached alkali produces a cloudy film on the surfaces of empty glass containers reducing their transparency as an accelerated weathering effect. The thin alkaline layer is not sufficiently leachable to break down during the usual washing procedure prior to filling the containers. This layer decomposes later during sterilization or storage of the filled containers occasionally within a relatively short time. The effect of the breakdown of this alkaline layer is to increase the alkalinity of the contained product to cause its discoloration or precipitation, to decrease potency or to increase toxicity beyond acceptable limits. The resultant alkalinity is sufficient to cause deleterious effects on pharmaceutical products such as stored drugs or water for injection so as to render them completely unusable.

Reducing the alkalinity of interior surfaces of glass containers has previously been accomplished by introducing a small pellet of material which when fired by heating the container, creates an acidic gas therein. Also acidic gas has been used in blowing glass containers to reduce their internal surface alkalinity. The acidic gas reacts with the interior surfaces to neutralize the alkalinity of the thin layer of high alkali glass. Sulphur pellets have been employed to achieve this neutralization by dropping one such pellet into each container and heating to a predetermined temperature to react the acidic gases with the interior glass surfaces. This procedure has been acceptable for relatively wide-mouth bottles and jars, but is unworkable for small-mouth containers, such as ampuls. Introducing a solid through the small constrictions of ampuls as they pass rapidly from a forming machine is impractical because of their very small openings. Furthermore, since ampuls are normally produced by forming methods rather than by blowing, internal acidic gas pressure cannot be employed to shape the glass and simultaneously reduce surface alkalinity.

Accordingly, an object of the present invention is to provide novel apparatus and methods for the treatment of inner surfaces of glass containers during their uninterrupted transfer from forming machine to annealing lehr.

Another object of this invention is to provide an improved economical method of reducing the alkalinity of internal surfaces of small-mouthed glass bottles or ampuls during their manufacture.

A further object of this invention is to provide suitable apparatus for treating the interior surfaces of glass containers having small openings during their conventional and continuous movement from forming machine to annealing lehr.

The specific nature of this invention as well as other objects and advantages thereof, will become apparent to one skilled in the art from the following detailed description taken in conjunction with the attached two sheets of drawings, on which by way of preferred example, is shown one modification of our invention.

On the accompanying drawings:

Fig. 1 is a partial perspective view of the apparatus for treating the interior surfaces of continuously moving glass containers;

Fig. 2 is a top plan view of the oscillating structure for the introduction of an acidic gas into the glass containers;

Fig. 3 is a vertical sectional view of the acidic gas discharge nozzle and glass container taken on line 3—3 of Fig. 1; and Fig. 4 is a front view of the trigger mechanism for operation of the oscillating structure.

Referring now to Fig. 1 the glass containers consist of hollow medicinal ampuls 10 produced by a forming machine and transferred while at an elevated temperature to an annealing lehr to relieve their stresses and to temper the glass. Both the forming machine and annealing lehr are omitted from the drawings because of their conventional construction although the latter constitutes a necessary part of our invention.

The glass ampuls 10 are transported from the forming machine upon their rapid issuance therefrom to an annealing lehr upon a continuously moving endless conveyor 12, a portion of which is shown in Fig. 1 extending in a linear path between the machine and lehr. The endless conveyor 12 has stationary longitudinal sides 14 and 15, which extend horizontally throughout its conveying length to support and retain the conveyed ampuls 10 in similar recumbent positions. One side 14 of the conveyor 12 is higher than the opposite side 15 for retaining the ampul bottoms in vertical positions during their movement. The lower side 15 is suitable for supporting the smaller ends of the ampuls 10.

The conveyor 12 has spaced vertical fingers or lugs 13 connected to a series of movable links 11 which travel within the inner surfaces of its sides 14 and 15. The lugs 13 extend upward beyond the upper edges of the sides 14 and 15. The vertical lugs 13 are flat plates for carrying articles on the conveyor 12 in uniformly spaced relationship throughout its conveying length. The vertical lugs 13 are located within the conveyor sides 14 and 15 in nearly opposing alignment to convey the ampuls 10 against their forward edges perpendicular to the direction of conveyor travel. The rigid links 11 near side 14, support a bottom edge portion of the ampuls 10 near the leading edges of lugs 13, as shown in Fig. 3. When the conveyor 12 is continuously operated at a uniform speed, the lugs 13 advance the glass ampuls 10 in equally spaced, single-file order at the same speed.

Each of the glass ampuls 10 has a cylindrically shaped body 16 comprising its major portion. Each ampul 10 is sealed at its larger end with a flat bottom forming a right-angled cylinder. The other end of each ampul 10 is formed with a relatively long tapering constriction or stem 17. The stem 17 is formed with an opening 18 at its outward extremity which provides access into the interior of the ampul 10. The opening 18 of each ampul 10 is able to be sealed after filling without affecting its contents. The ampuls 10 are normally produced with closely controlled dimensions so that their openings 18 are moved along on the conveyor 12 in the same plane as shown in Fig. 1.

A rigid stationary wall or panel 19 is mounted in a fixed position adjacent and parallel to the conveyor 12. The panel 19 has an elevated portion with a horizontal upper edge 20 on which is located an oscillating carrier 21. The oscillating carrier 21 supports an acidic gas discharge line 33 which has its opening directed toward the conveyor 12. A water atomizer 75 is also mounted on the panel 19 in a fixed position adjacent to the oscillating carrier 21 and similarly directed toward the conveyor 12.

The carrier 21 pivots about a vertical axis extending through the horizontal edge 20 of the vertical panel 19. A rigid shaft 52 is fixedly mounted on the panel edge 20 extending in a vertical direction through the height of the oscillating carrier 21 (shown in Fig. 2). The carrier 21 is held in place by gravity, resting upon the panel edge 20 partially rotatable about the vertical axis of the fixed shaft 52.

A cylindrical bearing 22 is located with its longitudinal axis in a vertical position freely fitted around the shaft 52. The lower surface of the cylindrical bearing 22 contacts the horizontal surface of the panel edge 20 and is rotatable thereon in surface-to-surface contact. A horizontal extension arm 23 is firmly attached to the top surface of the cylindrical bearing 22 with the shaft 52 extending through its longitudinal center line. The extension arm 23 is a narrow rectangular plate positioned generally perpendicular to the conveyor 12. The extension arm 23 and cylindrical bearing 22 together from a T-shaped structure which is held in place vertically on the shaft 52 by the top nut 53 which contacts the upper surface of the arm 23. One end of the extension arm 23 extends adjacent to and above side 15 of the conveyor 12. The portion of the arm 23 reaching over the conveyor 12 has two downwardly directed flanges 24, one of which is located at its end and the other in an intermediate area between that end and the pivotal bearing 22.

A trigger assembly is attached to the flanges 24 forming a continuation of the extension arm 23 to contact the individual lugs 13 on the near conveyor side 15. The trigger 25 consists of a circular bar positioned in a normally vertical direction with a small flat plate 26 adjoined to its lower end for contacting the forward edges of the lugs 13 on conveyor side 15. The trigger 25 extends through a circular disk 27 which is located in contact with the outward side of end flange 24. The trigger 25 is adjustable for height by a threaded set screw 71 in the cylindrical surface of disk 27. The disk 27 is connected to a horizontal pin 72 (shown in Fig. 2) which extends as a horizontal shaft through the vertical flanges 24. Another circular disk 28 similar to disk 27 is mounted on the pin 72 and attached thereto by a set screw 71 adjacent to the inner surface of end flange 24. A slightly larger disk 30 is similarly mounted on and fixed to the pin 72 also by a set screw 71 contacting the other surface of the inner disk 28. The disk 30 is employed to retain a torsion spring 29 in conjunction with the inner flange 24 around the pin 72. The ends of the torsion spring 29 are firmly fixed within recesses in the opposing surfaces of disk 30 and inner flange 24 to permit angular rotation of the trigger 25 about the horizontal axis of the pin 72. The disk 28 has a small plate 73 attached tangentially which serves as a stop against the torsional force of the spring 29. The plate 73 on disk 28 is set to hold the trigger 25 in a normally vertical position to initially contact the lugs 13. The spring 29 permits deflection of the trigger 25 after the carrier 21 reaches the limit of its angular deflection.

A rigid pin 31 is vertically attached to the horizontal edge 20 of panel 19 near the oscillating carrier 21. A spring 32 is attached from the upper end of pin 31 to an opening 54 in the other end of the extension arm 23 pointing away from the conveyor 12. The spring 32 serves to maintain the oscillating carrier 21 in a position relatively normal to the conveyor 12. The carrier 21 is moved against the tension of spring 32 by a lug 13 pushing the trigger plate 26.

A flexible gas line 33 leads from a gas supply source (not shown) to the oscillating carrier 21 which supports its discharge nozzle 43. The gas line 33 consists of a heavy rubber hose which is suitable for conducting sulphur dioxide gas to the oscillating carrier 21. The flexible line 33 has a filter 34, such as a fritted glass, interposed therein for the removal from the gas stream of solid impurities.

The gas line 33 is attached to the oscillating carrier 21 by a support bar 35 which is joined to the extension arm 23 by the top bracket 36. The bracket 36 is fixedly attached to the upper surface of the arm 23 by a bolt 37. The support bar 35 is threaded on its upper portion and extends in a vertical direction through the arm 23 and bracket 36. A nut 38 is attached to the upper threaded portion of the support bar 35 to support the bar 35 and regulate its height. A collet 39 is interposed between the nut 38 and the bracket 36 along with several washers 74 (shown in Fig. 1) for adjusting the height of the support bar 35 and permitting its angular rotation.

A tubular fitting 40 for connection to the gas line 33, and a short tube 41, are attached to the lower end of the support bar 35 both at right angles to the bar 35 and to each other. The interiors of the fitting 40 and tube 41 are joined to conduct the gas stream to the discharge nozzle 43. The short tube 41 has a tapered end 42 to fit the matching end of the discharge nozzle 43. The nozzle 43 consists of a small hypodermic needle having a large square end 44 with an internally recessed and tapered contour matching that of the tube end 42. A stainless steel hypodermic needle tube with a bore of 0.41 mm. has been successfully used.

A small partially split block 45 is fitted around the tube 41 with a bolt 46 joining its split end for firm attachment to the tube 41. A small flat tapering plate 47 is joined to the solid end of the split block 45 extending parallel to the nozzle 43 to a point near its discharge end. A small guard plate 48 is attached perpendicular to the tapering plate 47 and parallel to its supporting block 45 for retention and protection of the small delicate nozzle 43. The plate 48 has a small opening 49 through which the nozzle 43 projects. The nozzle 43 is held in place by a spring 50 retained in compression against its enlarged square end 44 and the inner surface of the small plate 48. The tapered surfaces of the tube end 42 and nozzle end 44 are thus held together to form a sealed joint for conducting the gas to the discharge end of the nozzle 43. The small flat plate 48 has a curved tip pointing downward below the stems 17 of the conveyed ampuls 10 and opposite to their conveyed direction. Thus an ampul stem 17a of excessive length is elevated by the plate 48 in passing the gas discharge nozzle 43 to prevent damage to the nozzle. The gas nozzle 43 is positioned generally perpendicular to the conveyor 12 with its opening in close alignment with the ampul openings 18 to register with their centers.

The support bar 35 which supports the acidic gas outlet has a connecting rod 55 firmly attached to its medial portion for controlling its angular adjustment. The connecting rod 55 has retention rings 63 at both ends, one of which is firmly fastened to the support bar 35 and the other to a vertical rod 57. A spring 56 is held in compression around the support bar 35 with its ends contacting the underside of the extension arm 23 and the attached retention ring 63 of the rod 55. With the spring 56 maintained in compression, the adjusting nut 38 is employed to raise or lower the gas outlet nozzle 43 while it is held firmly in position. The retention ring 63 on the other end of rod 55 is attached to the lower end of the vertical rod 57. The connecting rods 55 and 57 are firmly attached to the support bar 35 by set screws 71 in the retention rings 63 to form rigid horizontal and vertical extensions respectively, of the support bar 35.

Another connecting rod 58 having a freely rotatable retention ring 59 on one end, is fitted around the vertical rod 57 with its stud portion extending horizontally and rearwardly over the extension arm 23 through a short vertical column 60 attached to the arm 23. A spring 61 is held in compression between the column 60 and the retention ring 59 around the rod 58. The other end of the horizontal rod 58 is threaded to hold an adjustment knob 62 against the opposite side of the column 60. The horizontal rod 58 with its retention ring 59 is thus able to angularly move the nozzle 43 around the vertical axis of the support bar 35 as the adjustment knob is turned.

The bearing 22 of the oscillating carrier 21 has a lug 65 attached to the lower rearward portion of its cylindrical surface which lug extends below the panel edge 20. The lug 65 turns with the oscillating structure 21 to regulate the amount of its angular deflection. Two stationary nuts 66 are fastened to the upper rear side of the panel 19 in similar positions on each side of the lug 65 with their threaded openings facing the lug 65. Two bolts 68 and 69 are mounted within the nuts 66 to contact the lug 65 at its limits of deflection. A spring 70 is placed around each bolt 68 and 69 between its head and nut 66 for retaining the bolts 68 and 69 in fixed positions as limiting screws. By adjusting the bolts 68 and 69 into proper longitudinal alignment, the angle of oscillation of the carrier 21 is controllable to regulate the deflection of gas nozzle 43.

A small atomizer 75 is permanently mounted on the panel 19 by the bracket 77. A water supply source 78 is mounted near the panel 19 and connected to the atomizer 75 by the water line 80. The water is atomized using pressured air delivered to the atomizer 75 by an air line 79. The atomizer nozzle 76 is directed perpendicular to the direction of conveyor travel with its opening at the same height as the ampul openings 18. The atomizer nozzle 76 injects a small quantity of moisture into each ampul 10 as it is moved along on the conveyor 12. A single steam line with a small discharge nozzle may be employed in place of the atomizer 75 to introduce a small quantity of moisture into each ampul 10.

Referring now to operation of the apparatus for treating the ampuls 10. When the trigger plate 26 is not in contact with a conveyor lug 13, the spring 32 holds the limiting lug 65 against the end of limit bolt 68. As a conveyor lug 13 contacts and moves the trigger plate 26, the carrier 21 is moved through the angle shown in Fig. 2. The spring 32 is weaker than torsion spring 29 so that the entire carrier 21 is pivoted with the nozzle 43 in register with an ampul opening 18. When the lug 65 contacts the limit bolt 69, the carrier 21 can pivot no further. At this point the torsion spring 29 of the trigger assembly is twisted by the continued travel of the conveyor lug 13 in contact with the trigger plate 26. The spring 29 is twisted until the lug 13 clears under the plate 26. The spring 29 then returns the trigger 25 to an upright position with its lug 73 contacting the side of extension arm 23. Simultaneously the spring 32 pivots the carrier 21 back against the limit bolt 68 ready for cycling by the next conveyor lug 13. Each lug 13 on conveyor side 15 effects the same cyclic movement of the carrier 21. During the period of registry of nozzle 43 and ampul opening 18, an acidic gas stream 74 is directed into an individual ampul 10. The most beneficial gas for neutralization of the internal alkalinity has been found to be sulphur dioxide. The angle through which the nozzle 43 may be deflected to inject sulphur dioxide gas is independent of the height of the conveyor lugs 13. The angle may be varied from zero to the maximum necessary for the trigger plate 26 in vertical position to be horizontally rotated out of the path of an individual lug 13. An angle less than the maximum is preferable for introducing a uniform amount of gas into each ampul.

The sulphur dioxide gas is continuously discharged from gas nozzle 43. Because the carrier 21 swings back to be picked up by the next conveyor lug 13 so quickly in comparison with the time it is driven in synchronization with the conveyor, only a small percentage of the gas stream is not utilized. A small stream of gas must be used to permit displacement of some of the internal air outward through the same ampul openings 18. A prescribed amount of sulphur dioxide gas is injected into each ampul depending upon the amount required to obtain sufficient reduction of surface alkalinity. The sulphur dioxide gas resides within the ampuls as they are further conveyed to the moisture injection station. There a small amount of moisture is injected into each ampul to unit with the gas. The amount of moisture which is introduced is controlled by the rate of atomization of the atomizer 75 or discharge rate in the case of a small steam tube. Both the gas and moisture are retained within the ampuls during further movement to a heating operation which follows.

An annealing lehr or other type of heating unit is employed to furnish the required heat to react the acidic gases formed with the inner glass surfaces. The ampuls are heated to a temperature of 750° F. or above, to obtain the most beneficial reaction upon the alkaline layer. Sulphurous acid is principally formed which reacts with the leachable alkali of the glass to form primarily alkali sulphites. The presence of moisture produces a greater amount of solution of sulphurous acid which is convertible on heating. The transistory sulphurous acid reacts with atmospheric oxygen during the heating to form sulphuric acids. The action of the sulphurous acid on the leachable alkali forms alkali sulphates and sulphites on heating. When the ampuls are cooled from the heating operation, principally sulphates are visible on the inner surfaces as a cloudy bloom. The presence of the bloom indicates that the ampuls have been surface treated. The neutral salts, being very water soluble, are easily removed by water washing, either immediately following the treatment or prior to filling the ampuls. The usual washing processes common to the pharmaceutical industry, are satisfactory for removal of the bloom.

The ampuls are washed to remove any traces of the neutral salts from the interior surfaces. The resistance of the glass surfaces to action by aqueous or acidic solutions is considerably increased. In addition, the surfaces are much more resistant to weathering effects.

Ampuls of various sizes have been successfully given this improved treatment. The following list indicates the ampul volumes and inside diameters of their stems which have been so treated:

| | Mm. |
|---|---|
| 1 ml. | 3.04–4.44 |
| 2 ml. | 3.04–4.44 |
| 5 ml. | 3.82–5.32 |
| 10 ml. | 4.10–5.60 |
| 20 ml. | 4.80–6.40 |
| 50 ml. | 4.50–7.90 |

A method of measuring the alkalinity of ampuls is to fill the ampuls to their proper capacity with distilled water, seal their stems with a gas burner, autoclave for thirty minutes at 121° C., and then measure the amount of 0.02 normal sulphuric acid needed to neutralize the alkali in 100 ml. of the ampul contents.

The comparative results of treatment with sulphur dioxide alone and sulphur dioxide plus water, are shown in the test data listed below.

| Kind of treatment | Titration Before Treatment | Titration After Treatment | Reduction |
| --- | --- | --- | --- |
| Sulphur dioxide | 0.24 | 0.18 | 0.06 |
| Do | 0.37 | 0.26 | 0.11 |
| Do | 0.32 | 0.18 | 0.14 |
| Sulphur dioxide plus water | 0.30 | 0.09 | 0.21 |
| Do | 0.35 | 0.12 | 0.23 |
| Do | 0.37 | 0.10 | 0.27 |

The test data clearly shows that the subject treatment reduces the alkalinity to less than one-third of that of the untreated surfaces. The use of moisture with the sulphur dioxide gas halves the resultant alkalinity from that obtainable with sulphur dioxide alone.

As an alternate procedure the sulphur dioxide gas and moisture may be introduced into the ampuls simultaneously by the oscillating carrier. The small gas stream can be used to atomize the water or a gaseous mixture of sulphur dioxide and steam can be discharged together into the ampuls. The gaseous mixture amounts substantially to sulphurous acid which is introduced into each ampul to contact the alkali on the interior glass surfaces. On heating the acid reacts therewith to form primarily water soluble alkali sulfites. The thus created "bloom" may similarly be readily removed by water washing.

Various modifications may be resorted to within the spirit and scope of the appended claims.

We claim:

1. In combination, a conveyor for carrying open-ended narrow-necked heated glass ampuls in succession and through first and second treating zones, means on said conveyor to retain said ampuls in spaced-apart positions with their axes extending horizontally substantially transversely of the length of the conveyor and with their opened ends directed toward one side of the conveyor, means in said first zone for introducing an acidic gas into the ampuls and moisture introducing means in said second zone both said acidic gas and moisture introducing means juxtaposed adjacent to and in alignment with said opened ends of said ampuls during intervals of their conveyance.

2. The combination defined in claim 1 including a mechanism actuated by the conveyor for causing the acidic gas introducing means to travel a short distance in register with the restricted opened-end of each ampul.

3. In apparatus for treating the interior of hollow glass articles, a continuously moving conveyor on which the glass articles while at an elevated temperature are transported in single-file spaced relationship, vertical fingers attached to the conveyor to effect such relationship of the glass articles thereon, an oscillating carrier mounted adjacent to said conveyor, means for moving the carrier in one direction including an extension arm on said carrier positioned for contact with the said vertical fingers one at a time, an acidic gas discharge means on said oscillating carrier directed generally perpendicular and adjacent to said conveyor for introducing an acidic gas into the moving glass articles during an interval of their movement, and a moisture discharge means mounted adjacent to said conveyor for introducing moisture into the glass articles during another interval of their movement.

4. In apparatus for treating the interior of hollow glass articles, a continuously moving conveyor on which the opened glass articles are carried in single-file spaced relationship facing in a transverse direction, vertical fingers attached to the conveyor to effect such relationship of the glass articles thereon, a carrier mounted for oscillation adjacent to said conveyor, means for moving the carrier in one direction including an extension arm attached to said carrier positioned for synchronized angular deflection by contact with said moving vertical fingers, an acidic gas discharge means on said oscillating carrier directed transversely to the length of said conveyor for discharging the gas toward and into the opened end of each of said glass articles for an interval of its individual movement, a moisture discharge means mounted adjacent to said conveyor for introducing a small amount of moisture into each of the moving glass articles said amount of moisture being sufficient to chemically combine with said acidic gas, and a heating unit to elevate the temperature of said glass articles to react the acidic gases with their interior surfaces.

5. Apparatus for treating the interior of hollow opened glass articles including a continuously moving conveyor on which the glass articles are advanced in spaced-apart relationship while at an elevated temperature, vertical lugs attached to said conveyor to effect such spaced relationship of the glass articles, an oscillating carrier mounted adjacent to said conveyor, an extension arm attached to said oscillating carrier extending to contact the moving vertical lugs of said conveyor to effect the angular deflection of the oscillating carrier in one direction, resilient means attached to said oscillating carrier to effect its angular deflection in the reverse direction, acidic gas discharge means having a small outlet orifice attached to said oscillating carrier directed transversely to the length of said conveyor to register with the opened end of a near glass article moving in the same direction, and moisture discharge means having a small outlet orifice mounted adjacent to said conveyor for introducing moisture into each of the moving glass articles.

6. In combination, apparatus for treating hollow open-end heated glass articles including a continuously moving conveyor on which the said glass articles are carried in spaced apart recumbent positions, the said glass articles all having opened-ends facing in the same direction, vertical lugs attached to said conveyor to maintain the said glass articles in said spaced positions, an oscillating carrier mounted adjacent to said conveyor to oscillate through an angle facing said conveyor, an extension arm attached to said oscillating carrier to contact said vertical lugs of said conveyor to produce oscillation of said carrier in one direction, resilient means attached to said oscillating carrier to effect its oscillation in the opposite direction, an acdic gas discharge means attached to said oscillating carrier and directed to register coaxially and in succession with the opened ends of each of said moving glass articles, and moisture discharge means located adjacent to said conveyor and directed toward the open-ends of said moving articles to introduce moisture therein.

7. In combination, apparatus for treating hollow open-end glass ampuls conveyed while at elevated temperatures, including a continuously moving conveyor on which the said ampuls are carried in spaced transverse positions, the said ampuls each having an open-end and all of said ampuls facing in the same direction, means on said conveyor to maintain the said ampuls in such transverse positions, an oscillating carrier mounted adjacent to said conveyor to oscillate through an angle facing said conveyor, an extension arm attached to said carrier for contacting the said conveyor to angularly deflect said carrier in synchronization therewith, resilient means attached to said carrier to effect its oscillation in the opposite direction to said conveyor, an acidic gas discharge outlet attached to said carrier and directed to register in alignment with the opened-ends of said moving ampuls for an interval, and a moisture discharge outlet located in stationary relation adjacent to said conveyor to introduce moisure into said ampuls.

8. In a method of treating the interior surfaces of hollow glass containers having open ends therein during continuous travel of the containers to and through an annealing lehr to reduce the alkalinity on said interior surfaces, the steps of conveying the containers in a substantially linear path, during said conveying and at spaced points along said path, separately injecting several cubic centimeters of sulfur dioxide gas and a lesser amount of a gaseous dispersion of moisture into the open ends of said containers, introducing said containers into the lehr with the injected reagents in situ, heating the containers in the lehr to approximately 750° F. to simultaneously anneal the containers and cause reaction of the sulfur dioxide gas and moisture interiorly of the container with the alkalis on the interior surfaces thereof to form water-soluble alkali-containing compounds, removing the containers from the lehr, cooling the containers, and subsequently washing said interior surfaces with water to remove said compounds.

References Cited in the file of this patent

UNITED STATES PATENTS

| | | |
|---|---|---|
| 1,718,487 | Pipkin | June 25, 1929 |
| 2,027,983 | Kallus | Jan. 14, 1938 |
| 2,110,117 | Duldner | Mar. 1, 1938 |
| 2,238,153 | Blau | Apr. 15, 1941 |
| 2,273,778 | Berthold | Feb. 17, 1942 |
| 2,331,041 | Noble | Oct. 5, 1943 |
| 2,515,372 | Johnson et al. | July 18, 1950 |
| 2,525,725 | Rodman | Oct. 10, 1950 |
| 2,577,803 | Pfann | Dec. 11, 1951 |
| 2,738,607 | Beddoes | Mar. 20, 1956 |
| 2,794,301 | Law et al. | June 4, 1957 |

FOREIGN PATENTS

| | | |
|---|---|---|
| 556,602 | Great Britain | Oct. 12, 1943 |

OTHER REFERENCES

The Glass Industry, vol. 26, No. 6, June 1945, pages 275 to 277 and 290 to 293.